United States Patent
Rose et al.

[11] 3,898,263
[45] Aug. 5, 1975

[54] CARBONATES

[75] Inventors: John Brewster Rose, Letchworth; Ian Charles Taylor, Bengeo, both of England

[73] Assignee: Imperial Chemical Industries Limited, London, England

[22] Filed: June 4, 1973

[21] Appl. No.: 367,003

[30] Foreign Application Priority Data
June 16, 1972 United Kingdom............... 28297/72
June 27, 1972 United Kingdom............... 30049/72

[52] U.S. Cl. .................. 260/463; 260/49; 260/591
[51] Int. Cl.² .................. C07C 69/96; C07C 49/84
[58] Field of Search.......... 260/463, 591 (U.S. only)

[56] References Cited
UNITED STATES PATENTS

| | | | |
|---|---|---|---|
| 2,315,063 | 3/1943 | Lieber | 252/52 |
| 3,123,647 | 3/1964 | Duennenberger et al. | 260/591 |
| 3,146,269 | 8/1964 | Braus et al. | 260/591 |
| 3,792,075 | 2/1974 | Kaminaka et al. | 260/463 |
| 3,840,580 | 10/1974 | Feasey et al. | 260/463 |

*Primary Examiner*—Donald G. Daus
*Assistant Examiner*—Diana G. Rivers
*Attorney, Agent, or Firm*—Cushman, Darby & Cushman

[57] ABSTRACT

Carbonates having the formula

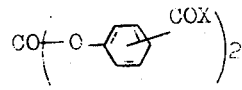

are provided in which X is a hydroxyl group or a halogen atom or a group having the formula

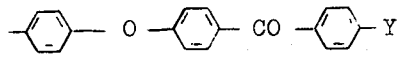

where Y is fluorine, chlorine or bromine. Preferably the carbonate group is para to the —COX group.

1 Claim, No Drawings

CARBONATES

This invention relates to novel carbonates and in particular to carbonates derived from phenols and substituted phenols therefrom.

According to one aspect of the present invention, carbonates having the formula

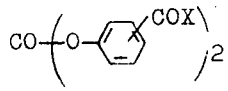

are provided in which X is a hydroxyl group or a halogen atom or a group having the formula

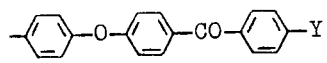

wherein Y is fluorine, chlorine or bromine. Preferably the carbonate group is para to the —COX group.

The carbonates of the present invention may be made for example by the following routes.

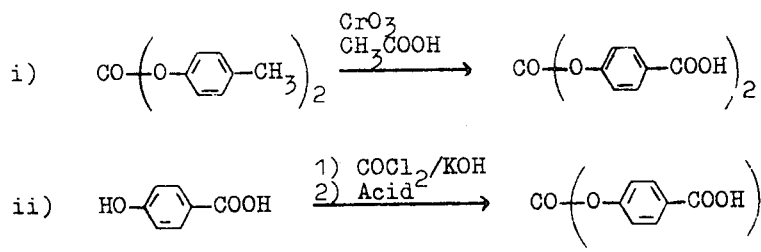

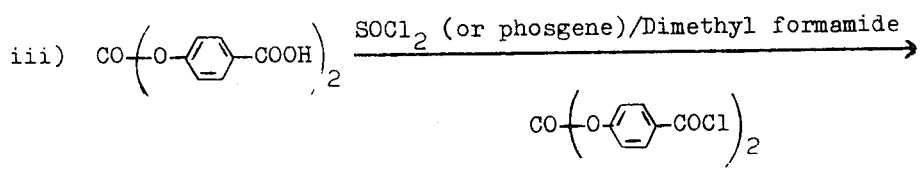

It is preferred that the benzene ring is further unsubstituted, but it may if required be substituted by any atom or group which is inert to the reaction conditions. Examples are halogen atoms, and alkyl and alkoxy groups containing up to 10 carbon atoms, and lower aryl groups containing one to three aromatic rings which may be fused.

The acid halides (X = halogen) may be converted into acid derivatives such as amides and esters by reaction with ammonia or amines and alcohols or phenols respectively. These derivatives and the acid (X = hydroxyl) may then be converted into the corresponding phenol by hydrolysis using a base, conveniently alkali metal hydroxide in alcoholic solution, to produce the corresponding phenate, followed by acidification, conveniently by dilute mineral acid, to precipitate the phenol. The phenol may then be washed, conveniently with methanol or ethanol, and may be used wet or may be dried before further use. Phenols so formed may be used as precursors in the preparation of dyestuffs, drugs or antioxidants or as starting materials in the production of polymers.

In a further aspect of the present invention, the chlorinated or brominated carbonate (X = chlorine or bromine) is used as a raw material in the preparation of substituted phenols and their precursors

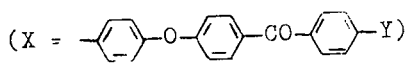

by Friedel-Craft condensation reactions. In such preparation the carbonate (X = chlorine or bromine) is reacted with an aromatic compound having at least one aromatically bound hydrogen atom replaceable under Friedel-Craft conditions

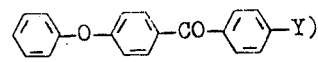

to form a phenol precursor. The substituted phenol is prepared from its precursor by hydrolysis with base (e.g. alkali metal hydroxide which will form alkali metal salt of the phenol) followed by separation of the phenol, for example following acidification. The substituted phenols having the formula (I)

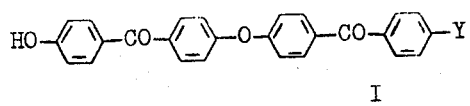

and their alkali metal salts, are useful as raw materials in the production of polymers as described for example in British patent specifications Nos. 1 153 035 and 1 177 183. Alternatively the carbonates of substituted phenols I can be polymerised without partial isolation of the phenol or its alkali metal salt.

The invention is illustrated by the following examples.

EXAMPLE 1

4-Hydroxy benzoic acid (23.7 g; 0.172 mole), potassium hydroxide (38.1 g; 0.343 mole), dimethyl formamide (5 cm³) and water (150 cm³) were mixed in a round bottomed flask fitted with nitrogen purge and stirrer and cooled to −2° to −4°C. Phosgene (25.5 g; 0.258 mole) in methylene chloride (200 cm³) cooled to −20°C was added slowly to the aqueous mixture over a period of 80 minutes; the temperature being maintained at −2°C to −4°C. After the addition, during which a white precipitate formed, the mixture was maintained at −2°C to −4°C for 30 minutes and allowed to rise to room temperature (ca 20°C) over a period of 16 hours under nitrogen atmosphere.

The white precipitate was filtered off, washed with water and dried in vacuo (about 15 torr) at 70°C. The solid was soluble in aqueous potassium hydroxide (2 normal) and dimethyl sulphoxide but substantially insoluble in isopropanol, methanol, chloroform, benzene and xylene. Infra-red (I.R.) and nuclear magnetic resonance (NMR) spectra of the white solid were consistent with its having the structure

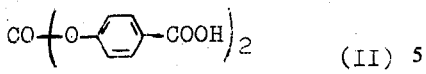

and mass spectroscopy showed a parent ion having molecular weight 302.

On acidification of the solution of the solid in aqueous potassium hydroxide, a gas was evolved and, on standing, a white precipitate formed which had the IR spectrum of 4-hydroxy benzoic acid.

A sample of the above carbonate (II; 10 g; 0.0331 mole) was suspended in dry toluene (50 cm$^3$). Thionyl chloride (12 g; 7.5 cm$^3$; 50% molar excess) and dimethyl formamide (0.5 cm$^3$) were added and the mixture refluxed for one hour. Because not all the carbonate had dissolved, a further amount (8 cm$^3$) of thionyl chloride was added whereupon the mixture became a yellow solution. Excess thionyl chloride was distilled followed by some toluene (ca 10 cm$^3$). The solution was filtered and cooled whereupon crystals were formed. The crystals were filtered off, washed with toluene and then with petroleum ether (boiling point 40°–60°C) before being dried under vacuo (about 15 torr) at room temperature (ca 20°C); yield 6.5 g; melting point 104°–105°C. The crystals were recrystallised from petroleum ether (boiling point 80°–100°C) and had IR and NMR spectra consistent with the formula

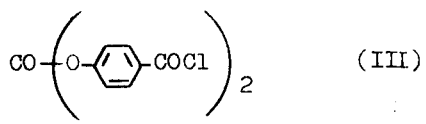

EXAMPLE 2

Bis(4-carboxyphenyl)carbonate (II; 3.1 g; 0.0434 mole), thionyl chloride (50 cm$^3$) and dimethyl formamide (1 cm$^3$) were heated at reflux for about 45 minutes until a homogenous solution was obtained and then excess thionyl chloride was distilled off. Dry sulphur-free toluene (50 cm$^3$) was added and the mixture heated to expel any residual thionyl chloride. About 10 cm$^3$ of toluene was also removed by distillation and the solution allowed to cool to about 20°C.

Aluminium chloride (resublimed; 19 g; 0.143 mole) was suspended in toluene (100 cm$^3$) and the chlorination solution added dropwise over 10 minutes, whereupon the solution warmed to 46°C. The mixture was heated to 90°C, further warmed for 40 minutes and allowed to cool. The reaction mixture, which appeared to contain a brown oil, was poured into water to yield a slightly yellow solid. A sample of this solid was washed with petroleum ether (boiling range 40°–60°C), then acetone and dried. Its NMR and IR spectra were consistent with its having the structure

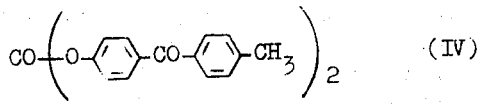

The carbonate (IV) was suspended in warm ethanol, in which it is slightly soluble, and a little aqueous potassium hydroxide (2 normal) was added dropwise. The reaction mixture became a clear yellow solution, and then became cloudy as potassium carbonate precipitated. The solid was filtered off and the solution was acidified to give a colourless solution with a little suspended solid (potassium chloride). This solid was filtered off and the solution was evaporated to dryness to give a white powder. Recrystallization from methanol, followed by washing with ether, gave a white crystalline solid, melting point 168°–169°, having IR and NMR spectra consistent with its having the structure

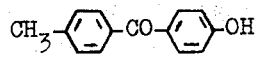

Bis[4-(4-chlorobenzoyl)phenyl]carbonate (V) was made by a method similar to that described for carbonate (IV) except that chlorobenzene was used instead of toluene.

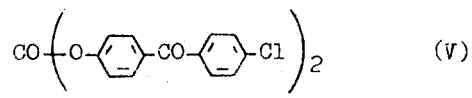

Carbonate (V) had a melting point 239°–240°C, and could be hydrolysed to give 4-(4-chlorobenzoyl)phenyl, the potassium salt of which could be polymerised by the method described in British Specification No. 1 153 035.

EXAMPLE 3

Bis(4-methyl phenyl)carbonate (1.8 g; 0.004 mole) prepared by a method similar to that described in Example 1 but using 4-methyl phenol in place of 4-hydroxy benzoic acid and phosgene/phenate ratio of 1:1, chromic anhydride (8 g; 0.08 mole) and glacial acetic acid (75 cm$^3$) were placed in a round bottomed flask (100 cm$^3$) fitted with stirrer and nitrogen purge and heated to 60°C. Reaction at 60°C was maintained for 24 hours. Water (50 cm$^3$) was added and after filtering, the resulting white precipitate was washed with water, slurried with boiling water and dried at 100°C for 16 hours (yield 0.95 g). The solid had IR spectrum consistent with its having the structure II.

EXAMPLE 4

4-Chlorobenzoyl chloride (17.5 g; 0.1 mole) and diphenyl ether (67 cm$^3$) were charged to a glass flask and after addition of resublimed ferric chloride (1 g), the mixture was heated to and maintained at 93°–94°C. The course of the reaction was followed by titrating evolved hydrogen chloride against standardised aqueous potassium hydroxide (1 normal). Further portions of ferric chloride (0.5 g) were added during the reaction. After 2 hours, the reaction was 90.5% complete, acetyl acetone (2 cm$^3$) was added, the mixture cooled and poured into methanol (700 cm$^3$). A white powder separated which was washed with cold methanol (twice) and then dried. The product (20.9 g; 67.6% yield) had IR spectrum consistent with the formula

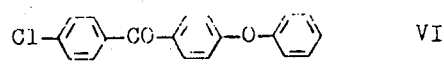

4-(4-chlorobenzoyl) diphenyl ether (VI; 29.05 g; 0.1 mole), bis-(4-chloro carbonyl phenyl)carbonate (III; 16.95 g; 0.05 mole) and aluminium chloride (36.7 g; 0.275 mole) were mixed with nitrobenzene (200 cm$^3$) and heated to about 95°C. The ensuing reaction was followed by titrating evolved hydrogen chloride with aqueous potassium hydroxide (1 normal). After 1.5 hours the reaction was >95% complete and the mixture after cooling was poured into methanol (1.5 dm$^3$). A white precipitate formed which was filtered off, washed twice with boiling methanol (1 dm$^3$) and dried for 16 hours. The solid was pale mauve and had a melting point 291°–296°C (yield 77%; 34.7 g) and had IR spectrum consistent with the formula

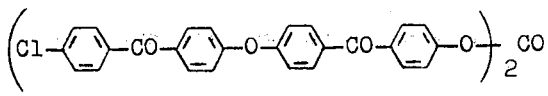

VII

A portion (34.4 g; 0.038 mole) of carbonate VII was suspended in ethanol (100 cm³) and aqueous potassium hydroxide solution (16.8 g, 0.152 mole of hydroxide; 110.6 g mole⁻¹ solution) was added. A further quantity (50 cm³) of ethanol was charged and the solution became very thick and turned yellow. A further quantity (100 cm³) of ethanol was added and the mixture heated at 60°C for two hours. A clear solution resulted but solid formed on cooling. The solution (A) was filtered and the filtrate was acidified with hydrochloric acid. A pink solid formed which was filtered, washed with water and dried. The solid was recrystallised from ethanol to give colourless platelets having melting point 195°–196°C (yield 1.7 g) and IR spectrum consistent with the formula

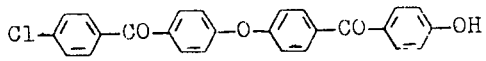

VIII

The solid from solution (A) formed a basic opalescent suspension in water. A sample on audification produced a white solid. The remainder was recrystallised from ethanol (200 cm³) as the potassium salt of chlorophenol (VIII).

A portion (8.5 g) of the above potassium salt was mixed with diphenyl sulphone (8.5 g) and the mixture heated for 4.5 hours at 330°–340°C in a glass flask fitted with nitrogen purge. The mixture became viscous. On cooling, a solid mass was obtained which was ground to a powder and extracted with boiling methanol (2 × 100 cm³), boiling water (100 cm³), again with boiling methanol (100 cm³) and dried.

The resulting polymer was compression moulded at 400°C to give a coherent but brittle film. The polymer had reduced viscosity in concentrated sulphuric acid of 1.80 (deep red solution; as measured at 25°C on a solution containing 1 g of polymer in 100 cm³ of solution).

EXAMPLE 5

4-Fluorobenzoyl chloride (31.7 g; 0.2 mole) and resublimed ferric chloride (1 g) were mixed with diphenyl ether (84 g) and heated in a flask to 95°C. The ensuing reaction was followed by titrating evolved hydrogen chloride against aqueous standardised potassium hydroxide (4 normal). Further portions of ferric chloride in quantities of 0.5 g were added at intervals during the reaction. After 5 hours at 95°C, the reaction was 91% complete. Acetyl acetone (2.5 cm³) was added to the reaction mixture which was then cooled to about 70°C before being poured into methanol (700 cm³) and the resultant solid filtered off. The solid was dissolved in chloroform, the solution evaporated to dryness to leave a red solid. The solid was dissolved in boiling petroleum ether (b.p. 80°–100°C; 500 cm³) and an oily red solid removed by filtration. The solution was boiled with charcoal, filtered and evaporated to dryness. The resulting white solid was recrystallised from petroleum ether (b.p. 80°–100°C) to give white crystals, melting point 96°–97.5°C (yield 29.3 g; 50%) having NMR and IR spectra consistent with the formula

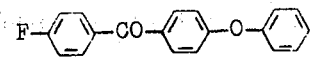

IX 4-(4-Fluorobenzoyl)diphenyl ether (IX, 29.2 g; 0.1 mole), bis-(4-chlorocarbonylphenyl)carbonate (II, 16.95, 0.05 mole) and resublimed ferric chloride (1 g) were mixed with nitrobenzene (50 cm³) in a flask and heated to about 110°C. The resulting reaction was followed by titrating the hydrogen chloride evolved against aqueous standardised potassium hydroxide (1 normal). Further amounts of ferric chloride were added during the reaction. After 19 hours, the reaction was 85% complete. Acetyl acetone (2 cm³) was added and the reaction mixture (a thick red paste) was poured into methanol (1 dm³) to form a red solution and a pink solid. The solid was washed with boiling methanol and dried. The solid had IR and NMR spectra consistent with its having the formula

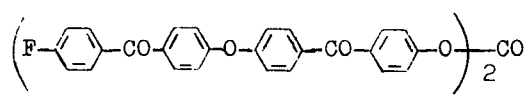

X

A sample of the above carbonate (X, 35 g; 0.041 mole) was suspended in ethanol (300 cm³) and aqueous potassium hydroxide solution (18.86 g potassium hydroxide, 0.164 mole, 115 g mole⁻¹ solution) added and washed into the solution with further ethanol (50 cm³). The solution was heated under reflux for two hours and the mixture filtered. The resulting yellow solution was acidified with aqueous hydrochloric acid and the resultant precipitate filtered and washed with water. The precipitate was recrystallised from ethanol to give white crystals having IR spectrum consistent with the formula

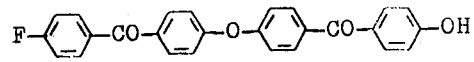

XI

A sample (1.0533 g) of fluorophenol (XI) dissolved in ethanol (150 cm³) was titrated against normal potassium hydroxide solution in methanol. Neutralisation required 2.48 cm³ of the potassium hydroxide solution. The bulk of the fluorophenol (XI; 12.2959 g) was suspended in ethanol (500 cm³) and sufficient of the above potassium hydroxide solution added (28.95 cm³) to neutralize the fluorophenol. A yellow solution resulted which was evaporated to dryness; the resulting yellow powder being dried for 15 hours at 120°C under vacuum (about 15 torr). The yield was 12.7 g (95%) of a salt having an infra-red indicating presence of water. The salt was polymerised in a similar manner to that of the chloroanalogue in Example 4 to yield similar polymeric material.

We claim:
1. A carbonate of the formula:

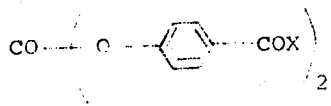
in which X is a group having the formula:
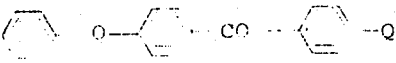
where Q is a chlorine, bromine or fluorine atom.
* * * * *